United States Patent
Schreier

[11] 3,832,783
[45] Sept. 3, 1974

[54] EXTENSIBLE STEEL TAPE RULES

[75] Inventor: Otto Heinz Schreier, Leigh-on-Sea, England

[73] Assignee: Fisco Products Limited, Raleigh, Essex, England

[22] Filed: Nov. 20, 1972

[21] Appl. No.: 307,809

[52] U.S. Cl. ................................................ 33/138
[51] Int. Cl. ............................................ G01b 3/10
[58] Field of Search .......... 33/172 F, 138, 139, 140; 116/67 A

[56] References Cited
UNITED STATES PATENTS
3,004,346  10/1961  Quenot ................................. 33/138
3,630,170  12/1971  Christo ............................. 116/67 A

*Primary Examiner*—Harry N. Haroian
*Attorney, Agent, or Firm*—Bacon & Thomas

[57] ABSTRACT

A datum mark carried by the outer end of a pivoted arm which bears against the outermost turn of an extensible steel tape rule mounted on a drum within a casing having a viewing window, may be observed through the viewing window and against the graduations on the tape within the casing. As the diameter of the roll of steel tape on the drum changes due to extension or retraction of the tape, the position of the datum mark changes so that the distance along the tape between the datum mark and the slot through which the tape passes remains substantially constant for all extensions of the tape.

3 Claims, 4 Drawing Figures

PATENTED SEP 3 1974    3,832,783

EXTENSIBLE STEEL TAPE RULES

This invention relates to extensible steel tape rules in which the casing is provided with a viewing window through which graduations on the tape within the casing may be read.

Conventional extensible steel tape rules which have a viewing window have a casing which has a rear flat face opposite the slot through which the tape may be extended. Associated with the viewing window is a datum mark against which graduations on the tape within the casing may be read and this datum mark is used for reading internal measurements. The distance between the rear flat face of the casing and the slot through which the tape extends is predetermined and the distance, along the tape, from the slot to the datum mark will be equal to this predetermined distance if the scale on the tape which is read through the viewing window has its origin at the end of the tape. If, however, the distance along the tape from the slot to the datum mark is greater than the distance between the slot and the rear flat face, the scale read through the viewing window will have its origin some distance from the end of the tape.

It is necessary to ensure that the length of the tape between the slot and the datum mark remains constant for all extensions of the tape and, in known constructions, this has been achieved by the provision of an elaborate guide system for the tape between the slot and the datum mark. This guide system necessarily promotes friction which impairs the free running of the tape.

It is the main object of this invention to provide an extensible steel tape rule in which the distance along the tape between the slot and datum mark remains constant for all extensions of the tape and in which the free running of the tape within the casing is not impaired.

According to the present invention there is provided an extensible steel tape rule, comprising a casing having a viewing window through which graduations on a tape within the casing may be read against a datum mark, the tape extending through a slot in the casing and being wound on a drum within the casing, wherein the datum mark is movable and lies adjacent the outermost turn of the tape on the drum, the datum mark forming part of a pivoted arm the position of which is determined by the position of the outermost turn of the tape on the drum, whereby the distance along the tape between the slot and the datum mark is substantially constant for all extensions of the tape.

Preferably, the pivoted arm carries a roller spring urged against the outermost turn of the tape on the drum.

One embodiment of extensible steel tape rule in accordance with the invention will now be described, by way of example only, and with reference to the accompanying drawing, in which.

Figure 1:
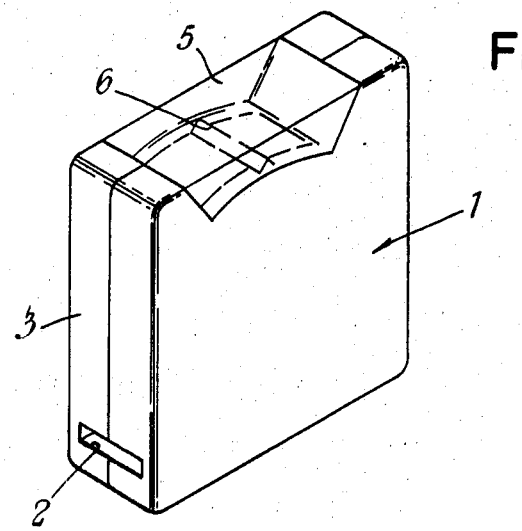
FIG. 1 is a perspective view of a rule in accordance with the invention.

The rule has a two-part casing 1 which is four sided in side elevation with a slot 2 in side wall 3 through which a tape 4 may be extended. The casing 1 also has a viewing window 5 through which graduations on the tape may be read against a datum mark 6. The casing has a shaft 7 supporting a drum 8 around which the tape 4 is wound. Mounted on pivot 9 is an arm 10 which carries the datum mark 6 and the arm 10 also carries a roller 11 which is urged by spring 12 against the outermost turn of the tape on the drum. The roller 11 acts as a sensing device for sensing the amount of tape on the drum and hence the amount of extension of the tape.

Figure 2:
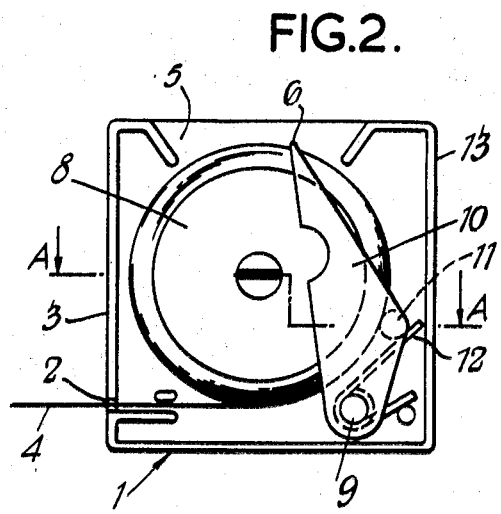
FIG. 2 is a side elevation of the rule of FIG. 1 with one part of the casing removed.
Figure 3:
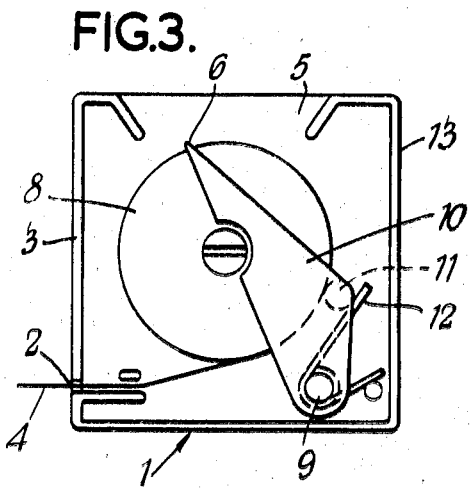
FIG. 3 is a view similar to FIG. 2 showing the tape in an extended condition.
Figure 4:
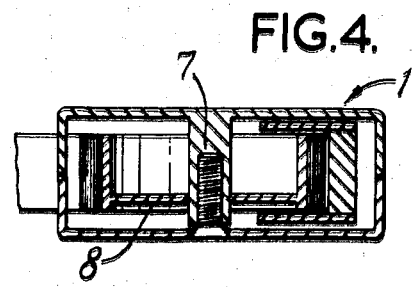
FIG. 4 is a cross-sectional view on the line A—A of FIG. 2.

The arm 10 is so dimensioned and mounted within the casing, that the datum mark 6 lies adjacent the outermost turn of the tape and beneath the viewing window and so that the position of the datum mark indicates a graduation on the tape such that the distance along the tape from the slot 2 to the datum mark 6 is constant for all extensions of the tape. It will be seen from FIGS. 2 and 3 that when several turns of tape are on the drum 8, as in FIG. 2, the datum mark 6 will be towards one end of the viewing window whereas, when the tape is extended as shown in FIG. 3, and hence the diameter of the outermost turn is smaller than with the tape retracted, the datum mark lies towards the other end of the viewing window, such movement being progressive and brought about by sensing roller 11.

The constant length of tape between the slot 2 and datum mark 6 may be equal to the length of the casing i.e., the distance between wall 3 and rear wall 13 whereby internal measurements may be made directly through the viewing window with the scale on the tape having its origin at the end of the tape. However, if the length of tape between the slot 2 and datum mark is greater than the distance between walls 3 and 13, the origin of the scale read through the viewing window will be some distance from the end of the tape. A further scale having its origin at the end of the tape is provided on the other side of the tape for use in external measurements.

The spring 12 in urging roller 11 against the tape 4 will assist in controlling the return of the tape if the rule is fitted with an automatic retraction spring. The pivoted arm 10 may be provided with a manually operable button which lies on the outside of the casing so that the roller 11 may be moved away from the tape, if desired. A locking device may be incorporated for securing the tape in any extended position.

The construction of the rule may be modified from that described above, for example, the roller 11 of the arm 10 may be urged against the tape by resilient means other than a spring or such resilient means may be dispensed with and a weight or the weight of the arm 10 utilised for this purpose.

I claim:

1. An extensible steel tape rule including a casing having a viewing window therein,
a drum within the casing,
a tape wound on the drum with part of the tape extending through a slot in the casing,
graduations on the tape which may be viewed through the viewing window,
wherein the improvement comprises an arm within the casing,
pivot means for pivoting said arm within said casing, sensing means carried by said arm and engaging the outermost turn of said tape, and a datum mark forming part of said arm and being disposed adjacent the outer turn of said tape and between said viewing window and said tape, the position of said arm and said datum mark being determined by the amount of tape on the drum, whereby the distance along the tape between the slot and the datum mark is substantially constant for all extensions of the tape.

2. An extensible steel tape rule according to claim 1 in which said sensing means comprises a roller on said arm, and spring means urges said roller against the tape on the drum.

3. An extensible steel tape rule according to claim 1, wherein the improvement further comprises the said casing being four sided in elevation, the said tape passing through a slot in one said side and the distance between the said one side and the opposite side of the casing being equal to the distance along the tape from the slot to the datum mark.

* * * * *